(12) United States Patent
Yamanaka et al.

(10) Patent No.: US 10,748,023 B2
(45) Date of Patent: Aug. 18, 2020

(54) REGION-OF-INTEREST DETECTION APPARATUS, REGION-OF-INTEREST DETECTION METHOD, AND RECORDING MEDIUM

(71) Applicant: CANON KABUSHIKI KAISHA, Tokyo (JP)

(72) Inventors: Masao Yamanaka, Tokyo (JP); Takahisa Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/200,437

(22) Filed: Nov. 26, 2018

(65) Prior Publication Data

US 2019/0095741 A1 Mar. 28, 2019

Related U.S. Application Data

(63) Continuation of application No. 15/059,179, filed on Mar. 2, 2016, now Pat. No. 10,169,673.

(30) Foreign Application Priority Data

Mar. 5, 2015 (JP) .................................. 2015-043745

(51) Int. Cl.
*G06K 9/32* (2006.01)
*G06T 7/11* (2017.01)
(Continued)

(52) U.S. Cl.
CPC ............ *G06K 9/3233* (2013.01); *G06K 9/342* (2013.01); *G06K 9/4671* (2013.01); *G06T 7/11* (2017.01)

(58) Field of Classification Search
CPC .... G06K 9/3233; G06K 9/342; G06K 9/4671; G06K 9/34; G06K 9/38; G06K 9/46;
(Continued)

(56) References Cited

U.S. PATENT DOCUMENTS 5,889,885 A * 3/1999 Moed ...................... G06K 9/38
382/171
5,900,953 A * 5/1999 Bottou .................... G06K 9/38
358/464

(Continued)

FOREIGN PATENT DOCUMENTS

JP 2014-215926 A 11/2014

OTHER PUBLICATIONS

Achanta, Radhakrishna, et al. "Salient region detection and segmentation." Computer Vision Systems (2008): 66-75. 14 pages (Year: 2008).*

(Continued)

*Primary Examiner* — Manav Seth
(74) *Attorney, Agent, or Firm* — Canon U.S.A., Inc. IP Division

(57) ABSTRACT

A region-of-interest detection apparatus for improving detection accuracy of a region of interest in a case where a region of interest overlaps a background region, or in a case where feature amounts of a region of interest and a background region are similar to each other calculates feature amounts of regions where partial regions and a background region set in an input image overlap each other, and based on the calculated feature amounts and a feature amount of each position in the input image, calculates a foreground level of the position in the input image. Then, the region-of-interest detection apparatus detects a region of interest from the input image based on the calculated foreground level and a saliency of the position.

15 Claims, 14 Drawing Sheets

(51) Int. Cl.
*G06K 9/34* (2006.01)
*G06K 9/46* (2006.01)

(58) Field of Classification Search
CPC .. G06K 9/2054; G06K 9/4652; G06K 9/6201; G06T 7/11; G06T 7/90; G06T 7/155; G06T 2207/20112; G01N 2021/8864
See application file for complete search history.

(56) References Cited

U.S. PATENT DOCUMENTS

| | | | | |
|---|---|---|---|---|
| 6,195,459 B1* | 2/2001 | Zhu | G06K 9/00456 | 382/155 |
| 6,282,317 B1* | 8/2001 | Luo | G06K 9/00234 | 382/203 |
| 6,301,382 B1* | 10/2001 | Smith | H04N 5/275 | 345/629 |
| 6,504,951 B1* | 1/2003 | Luo | G06K 9/00664 | 382/165 |
| 7,171,058 B2* | 1/2007 | Luo | H04N 1/3875 | 358/453 |
| 7,212,668 B1* | 5/2007 | Luo | G06T 11/001 | 382/165 |
| 7,236,629 B2* | 6/2007 | Cooper | G06K 9/00228 | 348/E9.04 |
| 7,333,654 B2* | 2/2008 | Luo | G06T 11/001 | 382/165 |
| 7,627,151 B2* | 12/2009 | Rowe | G06K 9/00013 | 340/5.53 |
| 7,949,186 B2* | 5/2011 | Grauman | G06K 9/4671 | 382/159 |
| 7,978,918 B2* | 7/2011 | Scalise | G06K 9/00234 | 348/77 |
| 8,027,385 B2* | 9/2011 | Yourlo | G06F 3/14 | 348/384.1 |
| 8,369,586 B2* | 2/2013 | Corcoran | G06K 9/00228 | 382/118 |
| 8,478,072 B2* | 7/2013 | Aisaka | G06T 11/60 | 358/450 |
| 8,494,256 B2* | 7/2013 | Aisaka | G06T 7/0002 | 382/156 |
| 8,649,606 B2* | 2/2014 | Zhao | G06K 9/4671 | 382/159 |
| 9,129,148 B1* | 9/2015 | Li | G06K 9/00268 | |
| 9,330,334 B2* | 5/2016 | Lin | G06K 9/4671 | |
| 9,355,432 B1* | 5/2016 | Goldman | G06T 3/0012 | |
| 9,483,709 B2* | 11/2016 | Perazzi | H04N 19/117 | |
| 9,712,743 B2* | 7/2017 | Corcoran | G06K 9/00228 | |
| 9,922,425 B2* | 3/2018 | Partis | G06T 7/11 | |
| 9,965,865 B1* | 5/2018 | Agrawal | G06T 7/194 | |
| 10,169,673 B2* | 1/2019 | Yamanaka | G06K 9/3233 | |
| 2004/0042662 A1* | 3/2004 | Wilensky | G06K 9/342 | 382/194 |
| 2009/0245626 A1* | 10/2009 | Norimatsu | G06K 9/3233 | 382/164 |
| 2009/0263038 A1* | 10/2009 | Luo | G06K 9/32 | 382/254 |
| 2012/0106837 A1* | 5/2012 | Partis | G06K 9/3241 | 382/165 |
| 2013/0064455 A1* | 3/2013 | Yamanaka | G06K 9/46 | 382/195 |
| 2014/0072212 A1* | 3/2014 | Sorgi | G06T 7/162 | 382/164 |
| 2016/0005182 A1* | 1/2016 | Ashani | G06K 9/46 | 382/173 |
| 2018/0082130 A1* | 3/2018 | Saitwal | G06T 7/194 | |
| 2018/0082442 A1* | 3/2018 | Saitwal | G06K 9/38 | |
| 2019/0311204 A1* | 10/2019 | Saitwal | G06T 7/194 | |
| 2019/0379873 A1* | 12/2019 | Collet Romea | H04N 9/75 | |

OTHER PUBLICATIONS

Denecke, Alexander, et al. "Online figure-ground segmentation with adaptive metrics in generalized LVQ." Neurocomputing 72.7 (2009): 1470-1482. 28 pages (Year: 2009).*

* cited by examiner

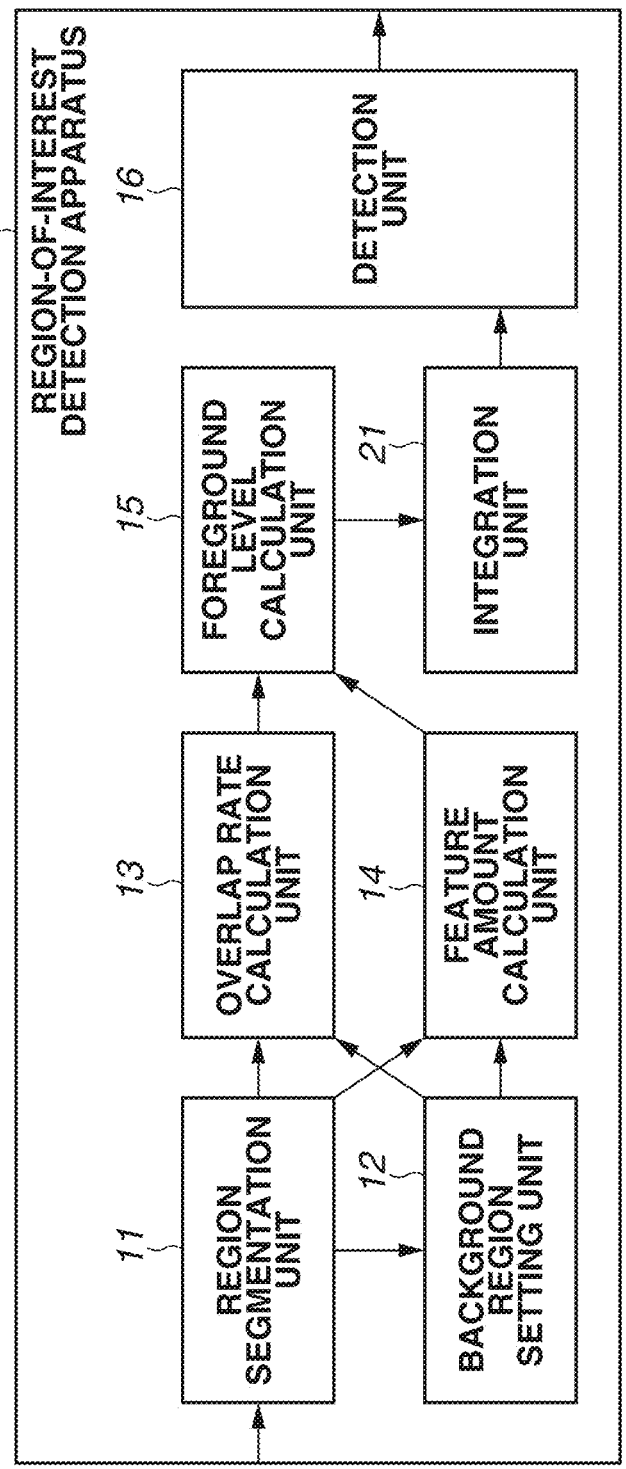

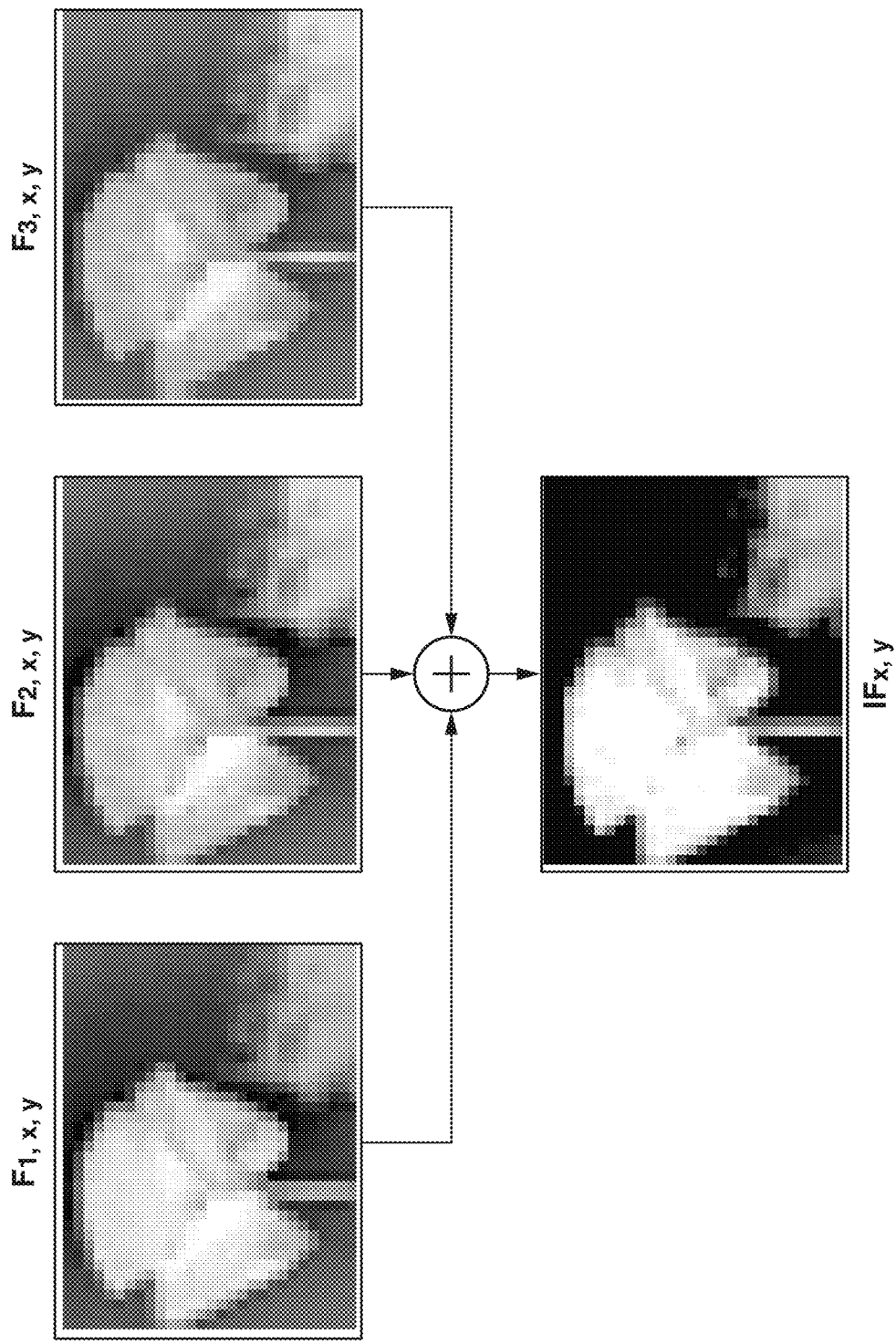

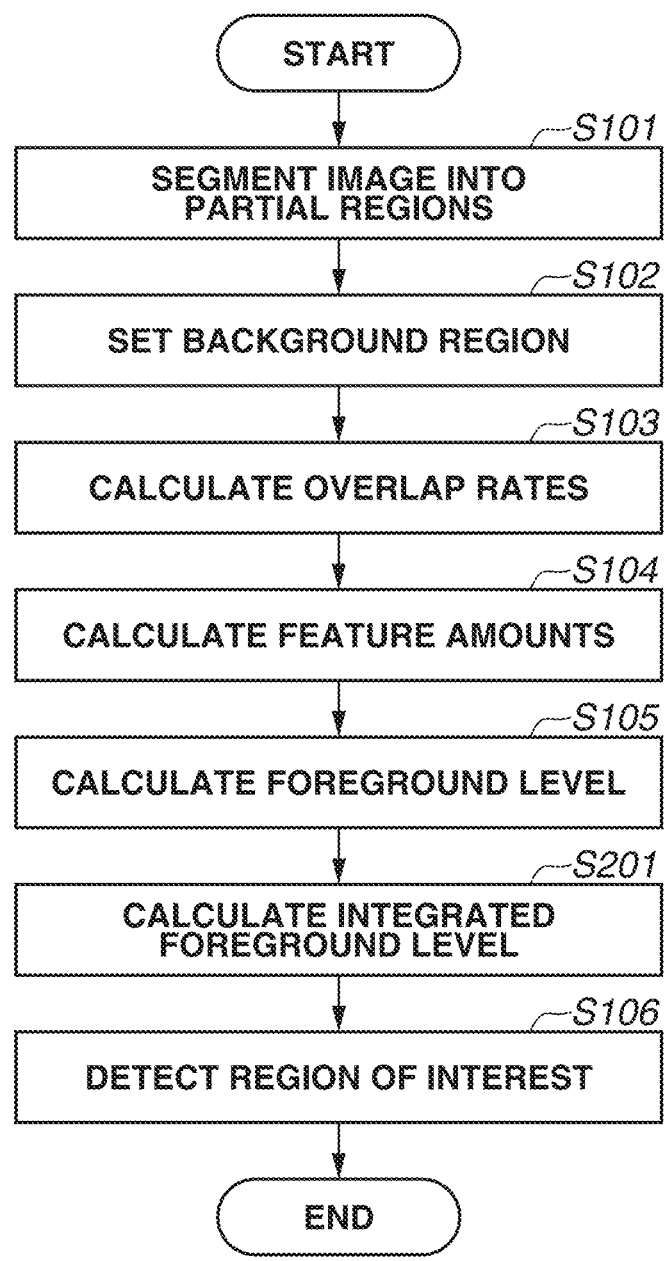

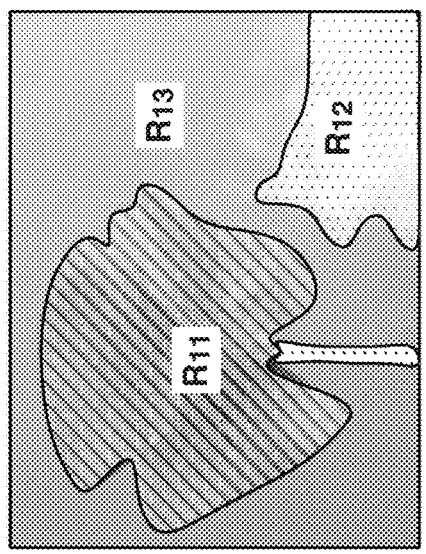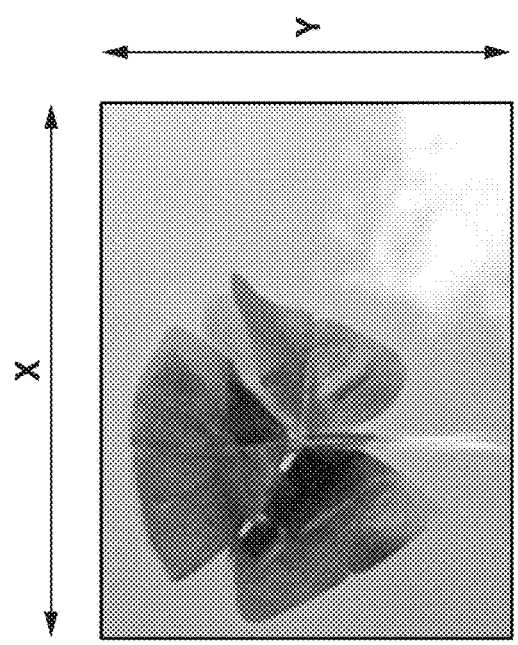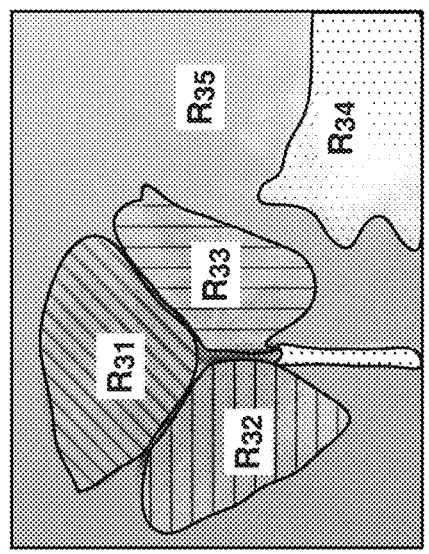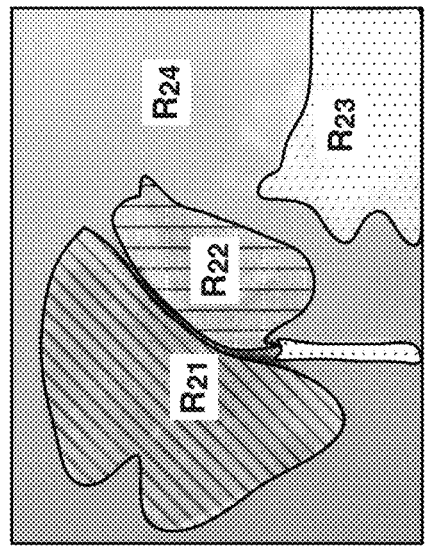

REGION-OF-INTEREST DETECTION APPARATUS, REGION-OF-INTEREST DETECTION METHOD, AND RECORDING MEDIUM

CROSS REFERENCE TO RELATED APPLICATIONS

The present application is a continuation of U.S. patent application Ser. No. 15/059,179, filed on Mar. 2, 2016, which claims priority from Japanese Patent Application No. 2015-043745, filed Mar. 5, 2015, which is hereby incorporated by reference herein in its entirety.

BACKGROUND

Field of the Disclosure

The present disclosure relates to a technique for detecting a region of interest from an input image based on a visual saliency.

Description of the Related Art

Conventionally, various methods for detecting a region of interest in an input image are known. Japanese Patent Application Laid-Open No. 2011-53759 discusses a method for extracting a region of interest as follows. First, regions in the four corners of an input image (the upper left, the upper right, the lower left, and the lower right of the image) are set as background regions, and feature amounts are extracted from the respective background regions. Then, based on the differences between the feature amounts extracted from the respective background regions and a feature amount extracted from each point in the image, the foreground level of the point in the image is calculated. Then, based on the magnitude of the foreground level, a region of interest in the image is detected.

However, the method discussed in Japanese Patent Application Laid-Open No. 2011-53759 has the following problem. If a region of interest overlaps a background region, or if the feature amounts of a region of interest and a background region are similar to each other, the detection accuracy of a region of interest decreases.

SUMMARY

According to an aspect of the present disclosure, a region-of-interest detection apparatus includes a segmentation unit configured to segment an input image into a plurality of partial regions, a setting unit configured to set a background region in the input image, a foreground level calculation unit configured to calculate a foreground level indicating a possibility of a foreground based on a plurality of feature amounts of the partial regions and a feature amount of each of a plurality of positions in the input image, a saliency calculation unit configured to, based on the feature amount of one of the positions in the input regions and a feature amount of a portion around the position, calculate a saliency indicating a degree of saliency of the position, and a detection unit configured to detect a region of interest based on the foreground level and the saliency of the position.

Further features of the present disclosure will become apparent from the following description of exemplary embodiments with reference to the attached drawings.

BRIEF DESCRIPTION OF THE DRAWINGS

FIG. 7 is a schematic block diagram illustrating a configuration of a region-of-interest detection apparatus according to a second exemplary embodiment.

FIG. 11 is a diagram illustrating a function of an integration unit according to the second exemplary embodiment.

FIG. 12 is a flowchart of a region-of-interest detection method according to the second exemplary embodiment.

FIGS. 13A, 13B, 13C, and 13D are diagrams illustrating a function of a region segmentation unit according to a third exemplary embodiment.

DESCRIPTION OF THE EMBODIMENTS

Figure 1:
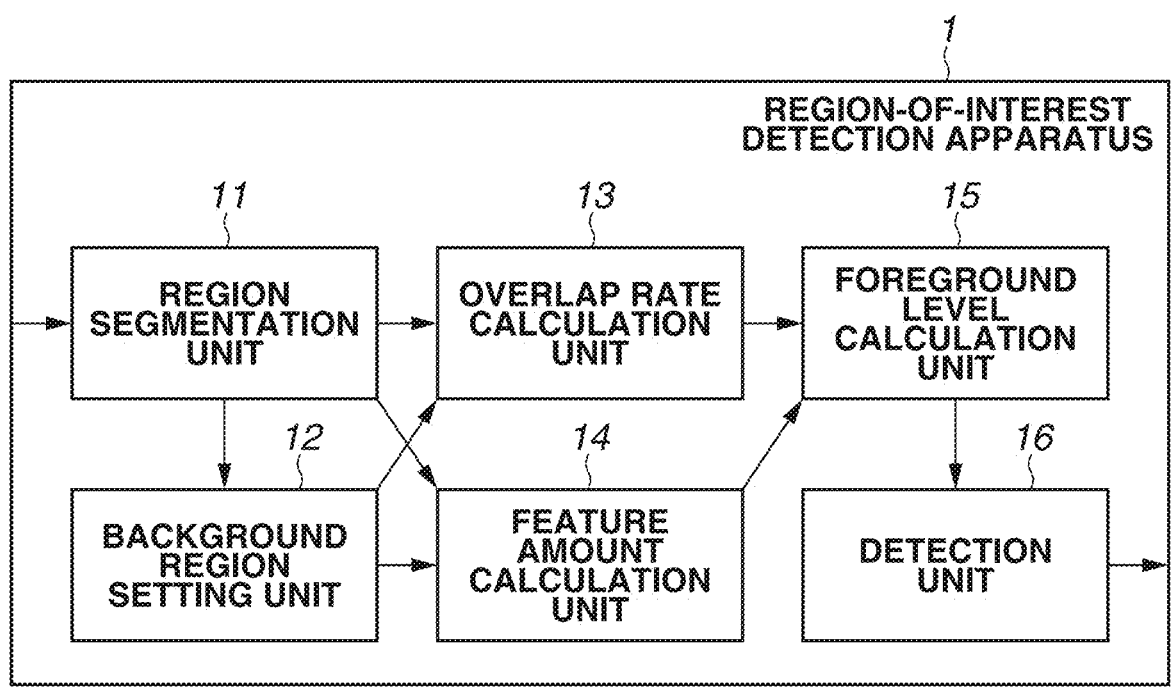
FIG. 1 is a schematic block diagram illustrating a configuration of a region-of-interest detection apparatus according to a first exemplary embodiment.

Exemplary embodiments of the present disclosure will be described in detail below with reference to the drawings. First, a first exemplary embodiment is described. FIG. 1 is a schematic block diagram illustrating a configuration of a region-of-interest detection apparatus according to the present exemplary embodiment. A region-of-interest detection apparatus 1 includes a region segmentation unit 11, a background region setting unit 12, an overlap rate calculation unit 13, a feature amount calculation unit 14, a foreground level calculation unit 15, and a detection unit 16.

The region-of-interest detection apparatus 1 according to the present exemplary embodiment is achieved by using a semiconductor integrated circuit (large-scale integration (LSI)). Alternatively, the region-of-interest detection apparatus 1 may include hardware components such as a central processing unit (CPU), a read-only memory (ROM), a random-access memory (RAM), and a hard disk drive (HDD). In this case, for example, each functional configuration described below and the processing of flowcharts described below are achieved by the CPU executing a program stored in the ROM or the HDD. The RAM includes a storage area functioning as a work area into which the CPU loads a program to execute the program. The ROM includes a storage area for storing a program to be executed by the CPU. The HDD includes a storage area for storing various programs required for the CPU to execute processing, and various types of data including data regarding a threshold.

Figure 2A:
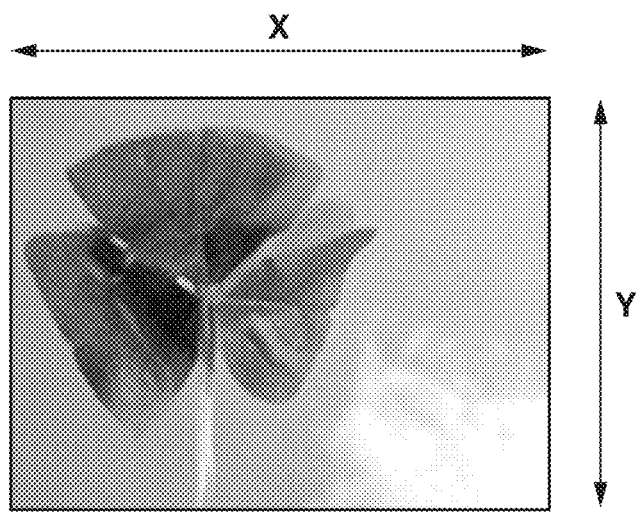
FIGS. 2A and 2B are diagrams illustrating a function of a region segmentation unit according to the first exemplary embodiment.
Figure 2B:
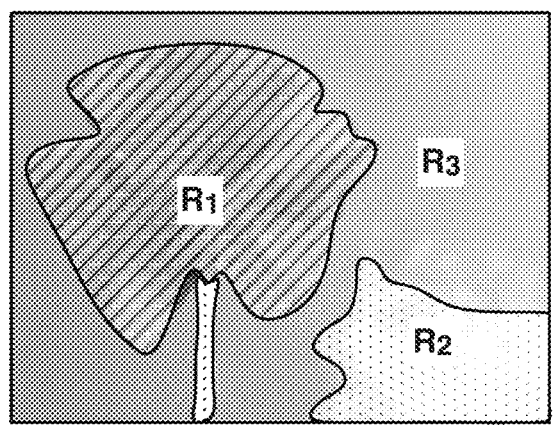

The region segmentation unit 11 acquires an input image input from the outside of the region-of-interest detection apparatus 1, and based on the similarities in color feature between pixels, segments the input image into N partial regions $R_n$ (n=1, . . . , N). FIGS. 2A and 2B illustrate a state where the region segmentation unit 11 segments the input image into the N partial regions $R_n$ (n=1, . . . , N). In this case, the horizontal size of the input image is X, and the vertical size of the input image is Y. In the example of FIGS. 2A and 2B, the region segmentation unit 11 segments the input image into three partial regions $R_n$ (n=1, . . . , 3) including partial regions $R_1$ (a shaded portion), $R_2$ (a dotted portion), and $R_3$ (a portion other than the shaded portion and the dotted portion). As a technique for segmenting an input image into a plurality of partial regions, a method discussed in "Dorin Comaniciu, Peter Meer, Senior Member, Mean shift: A robust approach toward feature space analysis, IEEE Trans. on PAMI, 2002.", and various automatic region segmentation algorithms may be used. The region segmentation unit 11 outputs the input image to the background region setting unit 12 and also outputs the result obtained by segmenting the input image into the N partial regions $R_n$ (n=1, . . . , N) to the overlap rate calculation unit 13 and the feature amount calculation unit 14.

Figure 3B:
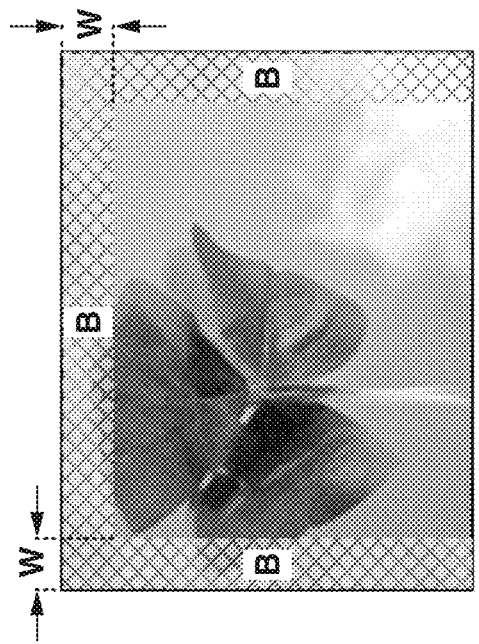
FIGS. 3A, 3B, 3C, and 3D are diagrams illustrating a function of a background region setting unit according to the first exemplary embodiment.
Figure 3D:
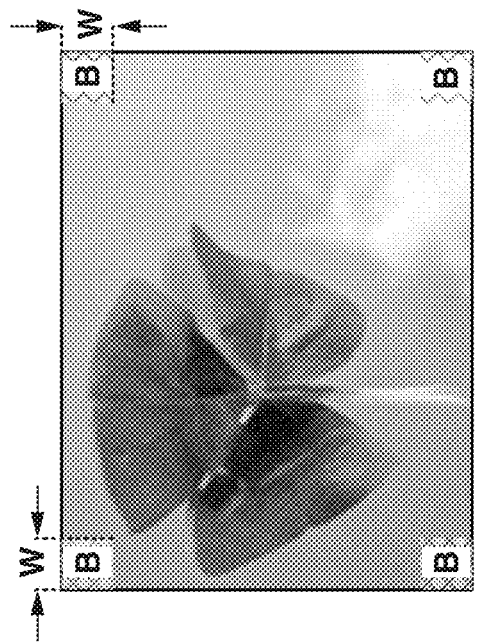
Figure 3A:
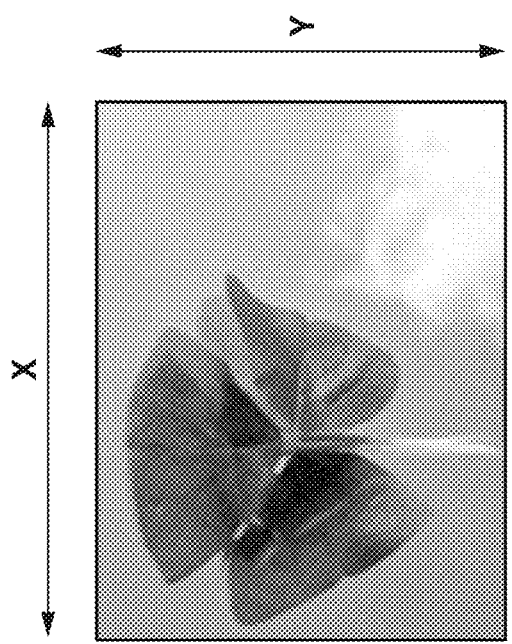
Figure 3C:
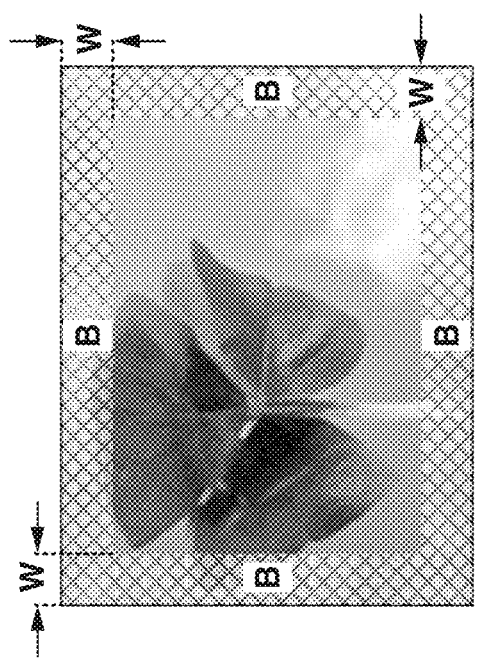

The background region setting unit 12 sets a background region B in the input image. FIGS. 3A to 3D illustrate states where the background region setting unit 12 sets the background region B. FIG. 3A is the original input image, and the background region setting unit 12 sets the background region B as in FIGS. 3B to 3D, for example. In the example of FIG. 3B, the background region setting unit 12 sets, as the background region B, image frame regions having a width W in a left portion, an upper portion, and a right portion of the input image. In the example of FIG. 3C, the background region setting unit 12 sets, as the background region B, image frame regions having the width W in a left portion, an upper portion, a right portion, and a lower portion of the input image. Further, in the example of FIG. 3D, the background region setting unit 12 sets, as the background region B, square regions having the width W in an upper left portion, an upper right portion, a lower left portion, and a lower right portion of the input image.

A background region setting method is not limited to these examples described above. The background region setting unit 12 may set, as the background region B, at least one or more regions in end portions of the input image. The size of the width W for setting the background region B may be determined as a predetermined value in advance, or may be determined for each input image by performing machine learning in advance so that an appropriate value is obtained using a learning image set to which the position and the size of a region of interest in an image are assigned. The background region setting unit 12 outputs the result of the set background region B to the overlap rate calculation unit 13.

The overlap rate calculation unit 13 calculates overlap rates $W_n$ (n=1, . . . , N) of regions ($R_n \cap B$) where the partial regions $R_n$ (n=1, . . . , N) generated by the region segmentation unit 11 segmenting the input image and the background region B set by the background region setting unit 12 overlap each other. As in the following mathematical formula 1, the overlap rates $W_n$ (n=1, . . . , N) are given as the ratios between an area $S_B$ of the background region B and areas $S_n$ (n=1, . . . , N) of the regions ($R_n \cap B$) where the partial regions $R_n$ (n=1, . . . , N) and the background region B overlap each other.

$$W_n = \frac{S_n}{S_B} \qquad \text{(formula 1)}$$

Alternatively, the overlap rates $W_n$ (n=1, . . . , N) may be given by the following mathematical formula 2. In other words, the overlap rates $W_n$ may be given as the ratios between areas $S'_n$ (n=1, . . . , N) of the partial regions $R_n$ (n=1, . . . , N) and the areas $S_n$ (n=1, . . . , N) of the regions ($R_n \cap B$) where the partial regions $R_n$ (n=1, . . . , N) and the background region B overlap each other.

$$W_n = \frac{S_n}{S'_n} \qquad \text{(formula 2)}$$

The overlap rate calculation unit 13 outputs the calculated overlap rates $W_n$ (n=1, . . . , N) to the foreground level calculation unit 15.

Figure 4A:
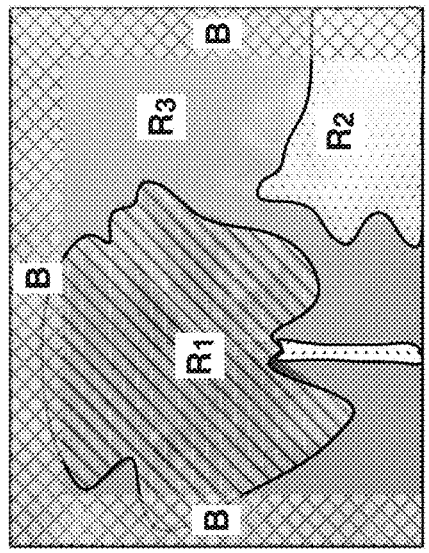
FIGS. 4A, 4B, 4C, and 4D are diagrams illustrating relationships between partial regions and a background region according to the first exemplary embodiment.
Figure 4B:
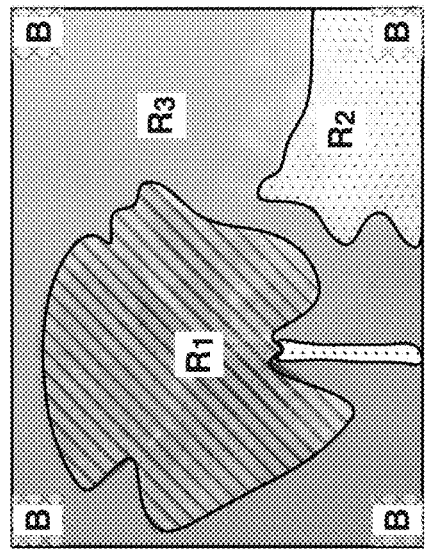
Figure 4C:
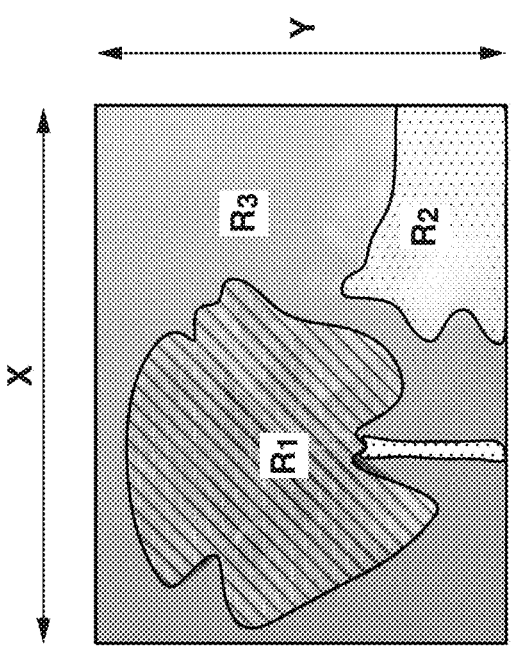
Figure 4D:
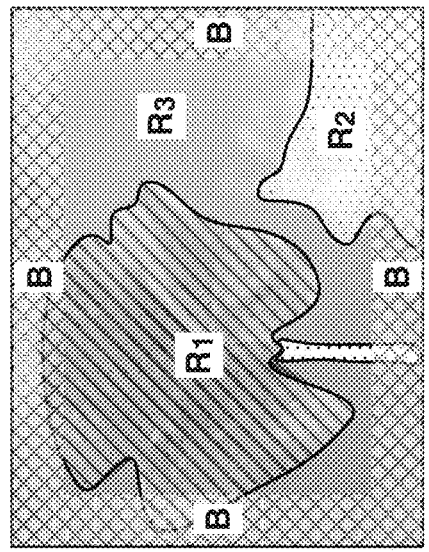

The feature amount calculation unit 14 calculates feature amounts $G_n$ (n=1, . . . , N) based on the partial regions $R_n$ (n=1, . . . , N) generated by the region segmentation unit 11 and the background region B set by the background region setting unit 12. The feature amounts $G_n$ (n=1, . . . , N) are given as the average values ($A(Y_n)$, $A(Cb_n)$, $A(Cr_n)$) of the color features of the regions ($R_n \cap B$) where the partial regions $R_n$ (n=1, . . . , N) and the background region B overlap each other. FIGS. 4A to 4D illustrate the regions ($R_n \cap B$) where the partial regions $R_n$ (n=1, . . . , N) and the background region B overlap each other. FIG. 4A illustrates a state where the input image is segmented into the partial regions $R_n$ (n=1, . . . , N). FIGS. 4B to 4D illustrate states where the partial regions $R_n$ (n=1, . . . , N) overlap the background region B set as in FIGS. 3B to 3D.

Alternatively, the feature amounts $G_n$ (n=1, . . . , N) may be given as the medians ($M(Y_n)$, $M(Cb_n)$, $M(Cr_n)$) of the color features of the regions ($R_n \cap B$) where the partial regions $R_n$ (n=1, . . . , N) and the background region B overlap each other. Further, the feature amounts $G_n$ may be given as basic statistical amounts ($F(Y_n)$, $F(Cb_n)$, $F(Cr_n)$). The feature amount calculation unit 14 outputs the calculated feature amounts $G_n$ (n=1, . . . , N) to the foreground level calculation unit 15.

The foreground level calculation unit 15 calculates a foreground level $F_{x,y}$ (x=1, . . . , X, y=1, . . . , Y) based on the overlap rates $W_n$ (n=1, . . . , N) calculated by the overlap rate calculation unit 13 and the feature amounts $G_n$ (n=1, . . . , N) calculated by the feature amount calculation unit 14. The foreground level $F_{x,y}$ indicates the possibility of a foreground at a point of interest (x,y) in the input image. Specifically, as in the following mathematical formula 3, the foreground level $F_{x,y}$ is given as the sum of products of distances $D_n$ (n=1, . . . , N) between the color features (Y, Cb, Cr) of the point of interest (x,y) in the input image and the feature amounts $G_n$ (n=1, . . . , N), and the overlap rates $W_n$ (n=1, . . . , N).

$$F_{x,y} = \sum_{n=1}^{N} D_n \cdot W_n \qquad \text{(formula 3)}$$

As in mathematical formula 4, the foreground level $F_{x,y}$ may be given as the maximum value of the sum of products of the distances $D_n$ (n=1, . . . , N) between the color features (Y, Cb, Cr) at the point of interest (x,y) in the input image and the feature amounts $G_n$ (n=1, ..., N), and the overlap rates $W_n$ (n=1, ..., N).

$$F_{x,y} = \max(D_1 \cdot W_1, D_2 \cdot W_2, \ldots, D_N \cdot W_N) \quad \text{(formula 4)}$$

The distances $D_n$ correspond to the differences between the feature amounts $G_n$ (n=1, ..., N) of the regions ($R_n \cap B$) calculated by the feature amount calculation unit 14 and the feature amounts of the point of interest (x,y) in the input image. Specifically, as in mathematical formula 5, the distances $D_n$ are given as Euclidean distances $DE_n$ or Manhattan distances $DM_n$ between the average values ($A(Y_n)$, $A(Cb_n)$, $A(Cr_n)$) of the color features of the regions ($R_n \cap B$) and the color features (Y, Cb, Cr) of the point of interest (x,y) in the input image.

$$\begin{cases} DE_n = \sqrt{(A(Y_n) - Y)^2 + (A(Cb_n) - Cb)^2 + (A(Cr_n) - Cr)^2} \\ DM_n = |A(Y_n) - Y| + |A(Cb_n) - Cb| + |A(Cr_n) - Cr| \end{cases} \quad \text{(formula 5)}$$

If the feature amount calculation unit 14 calculates the feature amounts $G_n$ (n=1, ..., N) using the medians of the color features of the regions ($R_n \cap B$) or other basic statistics, then in mathematical formula 5, the distances $D_n$ may be calculated using these values instead of the average values of the color features. The foreground level calculation unit 15 outputs the calculated foreground level $F_{x,y}$ to the detection unit 16.

The detection unit 16 obtains a saliency $S_{x,y}$ of each position (x,y) in the input image, and based on the saliency $S_{x,y}$ and the foreground level $F_{x,y}$ (x=1, ..., X, y=1, ..., Y) calculated by the foreground level calculation unit 15, detects a region of interest from the input image. In other words, in the present exemplary embodiment, the detection unit 16 functions as a unit for calculating a saliency and functions as a unit for detecting a region of interest based on the calculated saliency and a foreground level acquired from the foreground level calculation unit 15.

Figure 14:
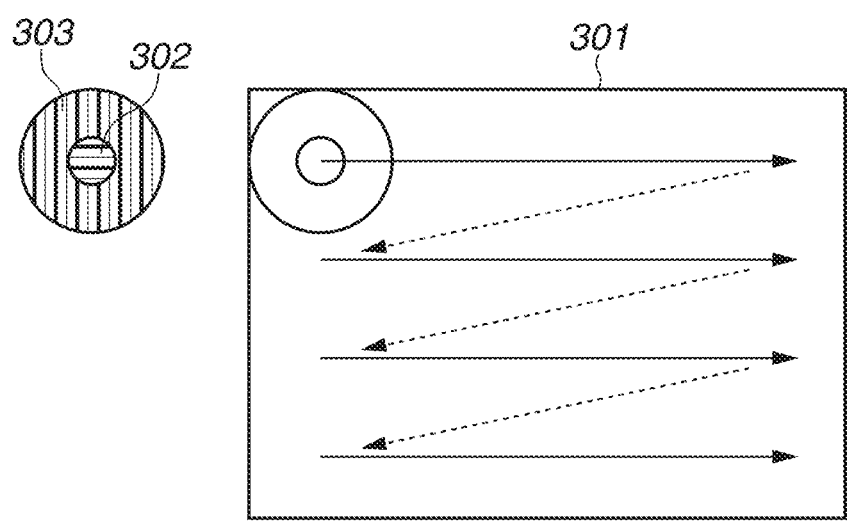
FIG. 14 is a diagram illustrating a process of obtaining a saliency according to the first exemplary embodiment.

The content of the technique for obtaining the saliency of each position in the input image is known and therefore is briefly described here. FIG. 14 is a diagram illustrating the process of calculating a saliency in the present exemplary embodiment. FIG. 14 illustrates an input image 301, a first region 302 of a scan window (an inside circular region), and a second region 303 of the scan window (an outside doughnut-shaped region). As illustrated in FIG. 14, the detection unit 16 performs the process of causing the scan window to scan the input image with respect to each row of pixels of the input image, thereby acquiring as a partial image a range included in the scan window at each pixel position. In the present exemplary embodiment, image data of regions obtained by cutting out ranges included in the first region 302 is defined as a first data group, and image data of regions obtained by cutting out ranges included in the second region 303 is defined as a second data group. In this manner, in the present exemplary embodiment, the scan window is caused to scan the input image, a partial region is cut out from each pixel of the input image, and two data groups including the first and second data groups are output to a distance calculation unit 202. The data groups regarding partial images obtained at this time include, for example, a low-level feature amount (such as a luminance value, edge intensity, and texture) or the combination of the low-level feature amounts. Then, the distances (the distance values) regarding these low-level feature amounts between the input first and second data groups are calculated. As a technique for calculating the distances between the data groups, for example, a method for creating a histogram for each of the two input data groups and calculating the sum of absolute differences between both histograms with respect to each bin can be used. As described above, the detection unit 16 obtains the saliency $S_{x,y}$ from the feature amounts of each position (x,y) in the input image and the feature amounts of a portion surrounding the position (x,y) and then creates a saliency map indicating the saliency of each position in the input image.

Next, the detection unit 16 updates the created saliency map based on the foreground level $F_{x,y}$. As a method for this, the detection unit 16 may add the value of the foreground level $F_{x,y}$ to the value of the saliency $S_{x,y}$ of each position in the saliency map, or either one of these values may be weighted to add to the other. Alternatively, the detection unit 16 may update the saliency map by another calculation. In the present exemplary embodiment, the foreground level $F_{x,y}$ is taken into account, and the detection unit 16 completes the creation of the saliency map where the saliency $S_{x,y}$ is placed on the image.

Figure 5A:
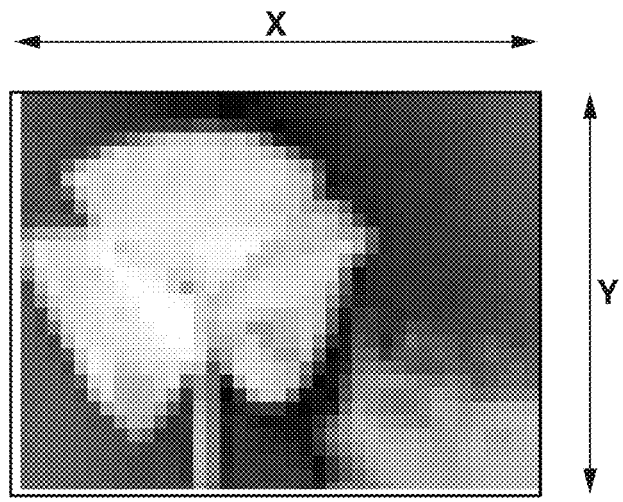
FIGS. 5A, 5B, and 5C are diagrams illustrating a function of a detection unit according to the first exemplary embodiment.
Figure 5B:
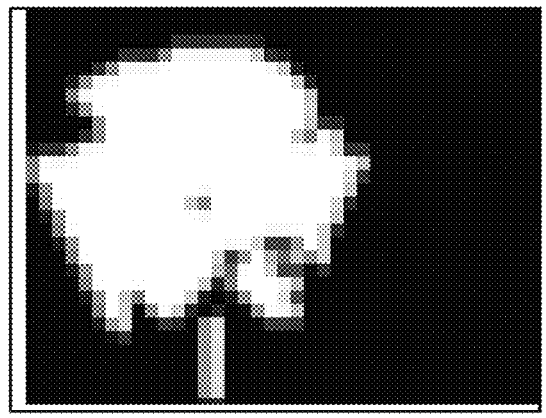
Figure 5C:
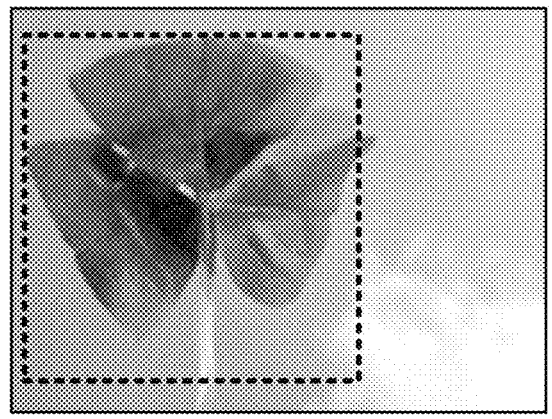

FIGS. 5A to 5C are diagrams illustrating a process of detecting a region of interest by the detection unit 16. FIG. 5A illustrates a saliency map updated based on the foreground level $F_{x,y}$ by the detection unit 16. Then, the detection unit 16 performs a binarization process on the saliency map, thereby separating a candidate region for a region of interest (a white region in FIG. 5B) and the other region (a black region in FIG. 5B) from each other. As a technique for performing a binarization process on the saliency map, a technique for minimizing intraclass variance and maximizing interclass variance to adaptively set a threshold may be employed, as discussed in "Nobuyuki Otsu: An Automatic Threshold Selection Method Based on Discriminant and Least Squares Criteria, The Transactions of the Institute of Electronics and Communication Engineers of Japan, J63-D-4 (1980-4), 349-356.". Further, as in FIG. 5C, the detection unit 16 sets a rectangular region circumscribing the obtained candidate region for a region of interest, thereby detecting a final region of interest.

The thus detected region of interest is output to an apparatus for performing processing using the result obtained by detecting the region of interest. For example, in an imaging apparatus such as a digital camera, the region of interest is used for the process of focusing on a detected region of interest and heightening the image quality of the region. Alternatively, a semiconductor integrated circuit included in an imaging apparatus such as a digital camera may achieve a function as the above-described region-of-interest detection apparatus. In this case, the imaging apparatus itself corresponds to the region-of-interest detection apparatus according to the present exemplary embodiment.

According to the configuration of the present exemplary embodiment, a region of interest is detected based on, in addition to the saliency of each position in the input image, the foreground level indicating a possibility of a foreground, whereby it is possible to detect a region of interest with high accuracy. If the foreground level is not taken into account, a region of interest is determined based only on the saliency. Thus, a region where the feature amounts are different between the inside and the outside of the scan window may be detected as a region of interest. For example, in the case of FIG. 2B, although a region between the regions $R_1$ and $R_2$ is merely a background region, the region may be regarded as salient if the feature amounts are different between the region and a portion surrounding the region. Thus, in the configuration using only the saliency, such a region may be detected as a region of interest. In the present exemplary embodiment, a region of interest is detected using the foreground level indicating a possibility of a foreground, whereby it is possible to detect as a region of interest the region of an object suitable for the foreground (a flower) as illustrated in FIG. 5C, for example.

Figure 6:
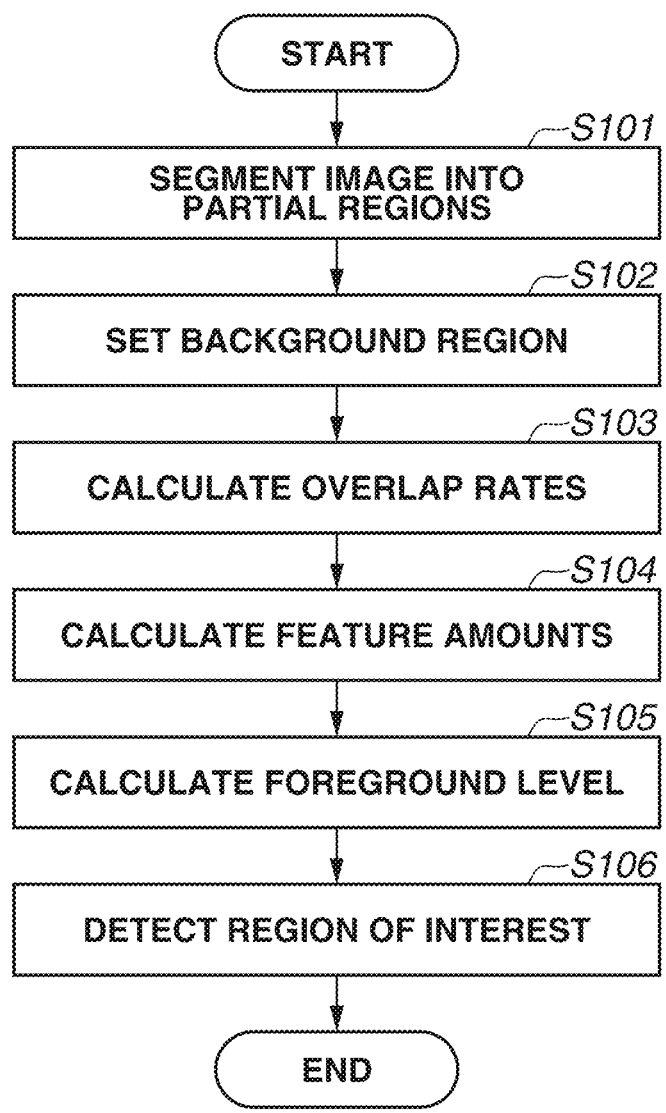
FIG. 6 is a flowchart of a region-of-interest detection method according to the first exemplary embodiment.

FIG. 6 illustrates a flowchart of a region-of-interest detection method according to the present exemplary embodiment. Upon starting this processing, in step S101, the region segmentation unit 11 acquires an input image, and based on the similarities in color feature between pixels, segments the input image into N partial regions $R_n$ (n=1, ..., N). Next, in step S102, the background region setting unit 12 sets a background region B in the input image.

In step S103, the overlap rate calculation unit 13 calculates overlap rates $W_n$ (n=1, ..., N) of regions ($R_n \cap B$) where the partial regions $R_n$ (n=1, ..., N) generated by the region segmentation unit 11 and the background region B set by the background region setting unit 12 overlap each other. Then, in step S104, the feature amount calculation unit 14 calculates, as feature amounts $G_n$ (n=1, ..., N) of the regions ($R_n \cap B$), information about (e.g., the average values of) the color features of the regions and outputs the information to the foreground level calculation unit 15.

In step S105, the foreground level calculation unit 15 calculates a foreground level $F_{x,y}$ (x=1, ..., X, y=1, ..., Y) based on the overlap rates $W_n$ (n=1, ..., N) and the feature amounts $G_n$ (n=1, ..., N). Then, in S106, the detection unit 16 obtains a saliency $S_{x,y}$ to create a saliency map, also updates the saliency map based on the foreground level $F_{x,y}$, and detects a region of interest based on the saliency map. The processes of the steps in the region-of-interest detection method according to the present exemplary embodiment do not need to be executed in order. For example, the process of segmenting the input image into partial regions in step S101 and the process of setting a background region in step S102 may be performed in parallel.

As described above, according to the present exemplary embodiment, the feature amounts of regions where partial regions and a background region set in an input image overlap each other are calculated. Then, based on the feature amounts of the overlap regions and the feature amounts of each position in the input image, the saliency of the position in the input image is calculated. Thus, even if a region of interest overlaps a background region, or even if the feature amounts of a region of interest and a background region are similar to each other, it is possible to detect a region of interest with high accuracy based on the calculated saliency.

In the above description, the foreground level calculation unit 15 calculates the foreground level $F_{x,y}$ based on the overlap rates $W_n$ (n=1, ..., N) and the feature amounts $G_n$ (n=1, ..., N). Alternatively, the foreground level calculation unit 15 may calculate the foreground level $F_{x,y}$ based on the distances $D_n$ (n=1, ..., N) derived from the feature amounts $G_n$, without using information of the overlap rates. For example, as in the following mathematical formula 6, the foreground level $F_{x,y}$ may be given as the minimum value of the distances $D_n$ (n=1, ..., N).

$$F_{x,y}=\min(D_1,D_2,\ldots,D_N) \quad \text{(formula 6)}$$

Further, attention may be paid to partial regions $R_n$ (n=1, ..., N') of which the overlap rates $W_n$ (n=1, ..., N) are equal to or greater than a threshold T. In other words, as in the following mathematical formula 7, the minimum value of distances $D_n$ (n=1, ..., N') between the color features (Y, Cb, Cr) of the point of interest (x, y) in the input image and the feature amounts $G_n$ (n=1, ..., N') of the partial regions $R_n$ (n=1, ..., N') of which the overlap rates $W_n$ (n=1, ..., N) are equal to or greater than the threshold T may be obtained. At this time, the threshold T may be a predetermined value determined in advance, or may be determined for each input image by performing machine learning in advance so that an appropriate value is obtained by using a learning image set to which a position and a size of a region of interest in an image are assigned.

$$F_{x,y}=\min(D_1,D_2,\ldots,D_N) \quad \text{(formula 7)}$$

As described above, the saliency $S_{x,y}$ is calculated without using information of the overlap rates, whereby it is possible to omit the overlap rate calculation unit 13 and the processing performed thereby.

Next, a second exemplary embodiment of the present disclosure will be described. In a configuration according to the second exemplary embodiment of the present disclosure, a plurality of background regions $B_k$ (k=1, ..., K) are set, and foreground levels $F_{k,x,y}$ (k=1, ..., K) calculated for the respective background regions are hierarchically summed up, thereby calculating an integrated foreground level $IF_{x,y}$. The components already described in the first exemplary embodiment are designated by the same numerals and are not described here.

FIG. 7 is a schematic block diagram illustrating the configuration of a region-of-interest detection apparatus according to the present exemplary embodiment. The region-of-interest detection apparatus 1 according to the present exemplary embodiment includes an integration unit 21 in addition to the function units described in the first exemplary embodiment. Further, in the present exemplary embodiment, the content of the processing executed by the background region setting unit 12 is different from that in the first exemplary embodiment.

In the present exemplary embodiment, the background region setting unit 12 sets a plurality of background regions $B_k$ (k=1, ..., K) in an acquired input image. FIGS. 8A to 8C, 9A to 9C, and 10A to 10C illustrate the states of the background regions $B_k$ (k=1, ..., K) set by the background region setting unit 12.

Figure 8A:
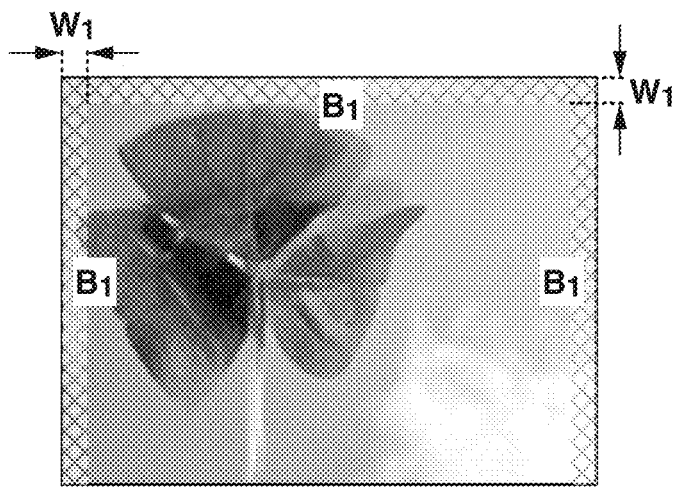
FIGS. 8A, 8B, and 8C are diagrams illustrating an example of a method for setting background regions according to the second exemplary embodiment.
Figure 8B:
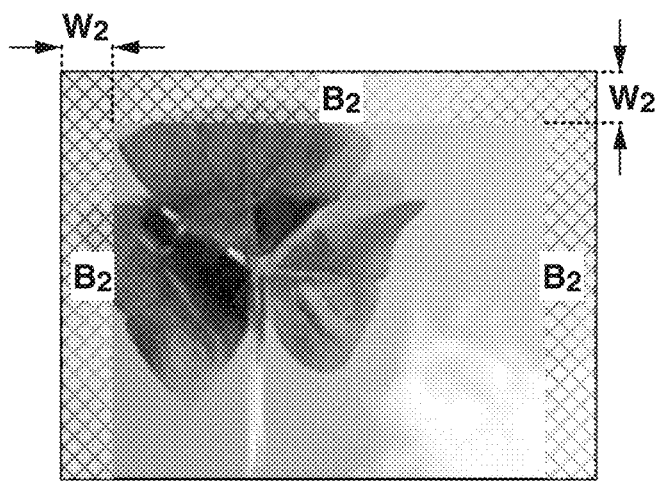
Figure 8C:
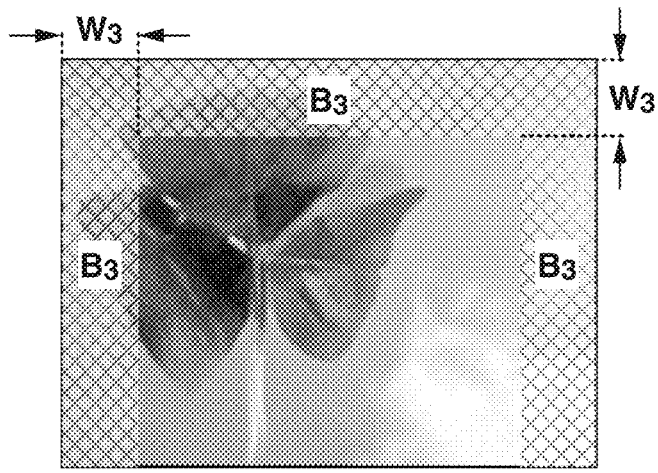
Figure 9A:
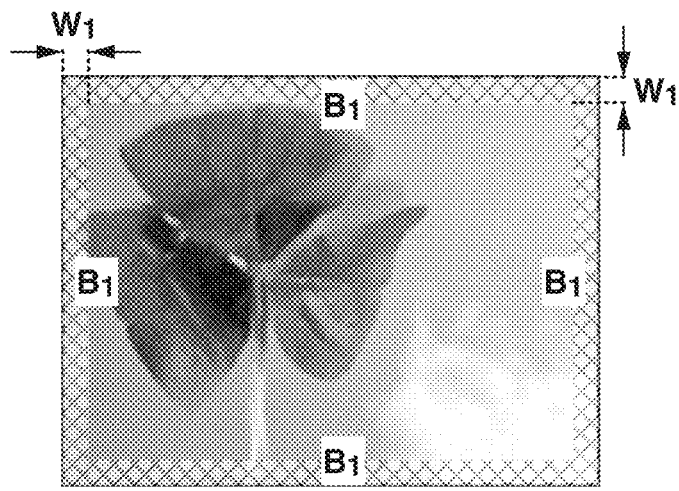
FIGS. 9A, 9B, and 9C are diagrams illustrating another example of the method for setting background regions according to the second exemplary embodiment.
Figure 9B:
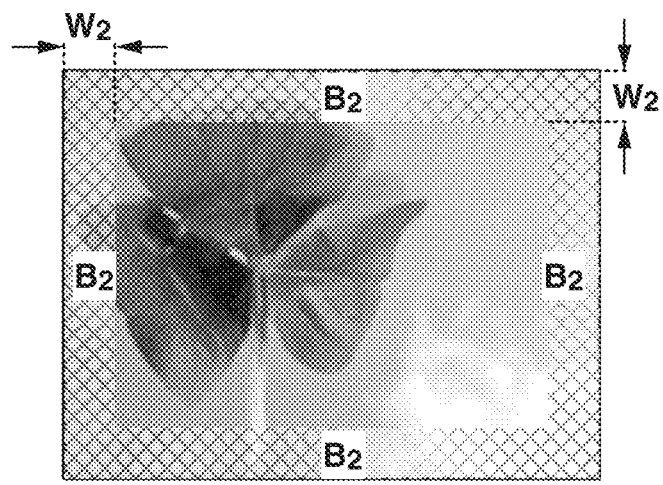
Figure 9C:
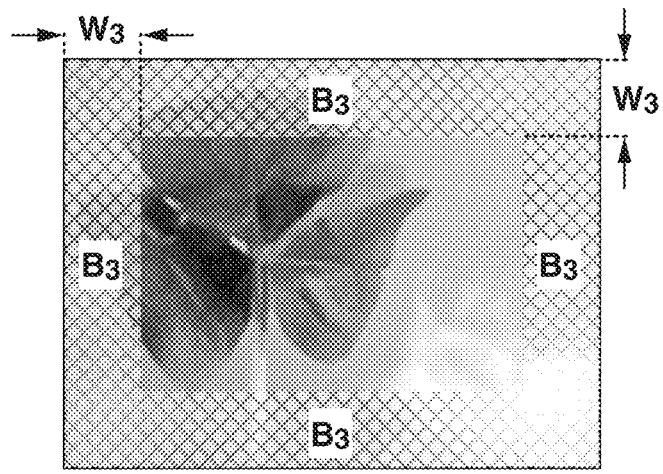
Figure 10A:
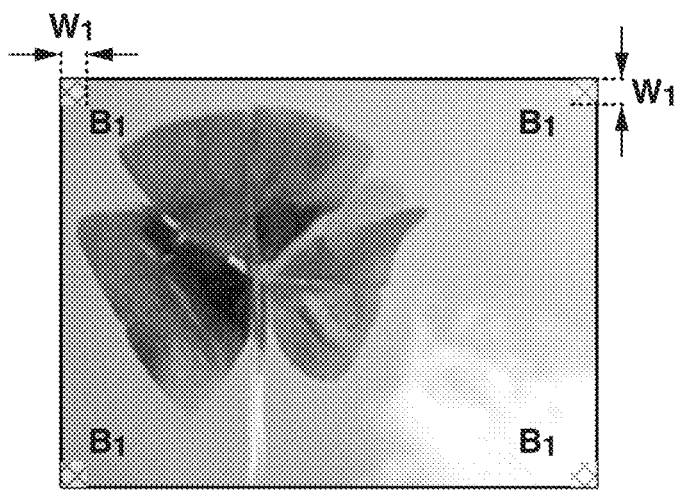
FIGS. 10A, 10B, and 10C are diagrams illustrating yet another example of the method for setting background regions according to the second exemplary embodiment.
Figure 10B:
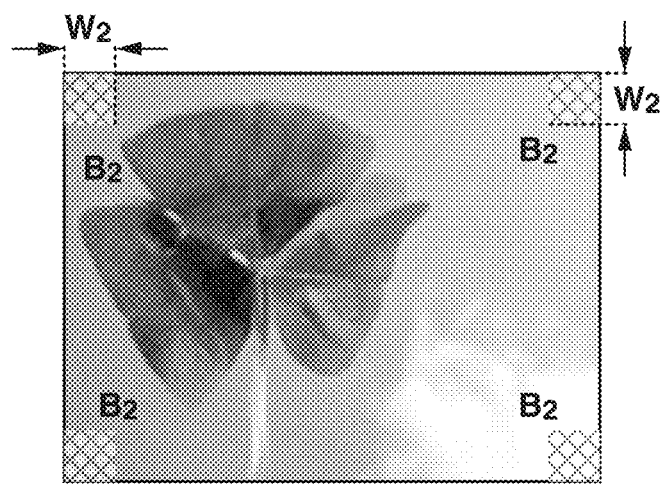
Figure 10C:
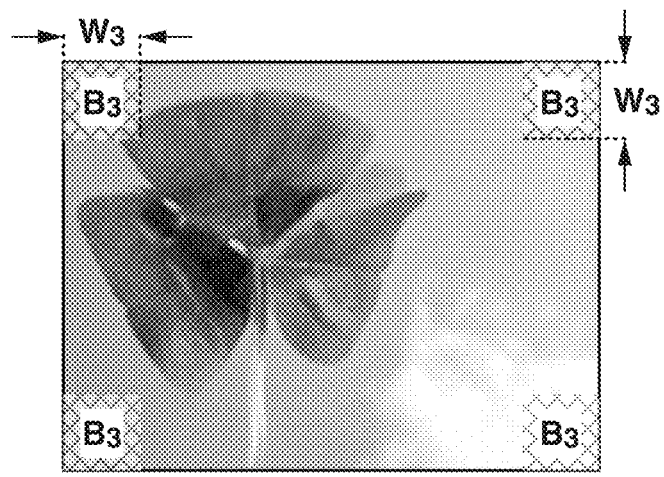

For example, as in FIGS. 8A to 8C, the background region setting unit 12 sets, as the background regions $B_k$ (k=1, ..., K), image frame regions defined by a plurality of widths $W_k$ (k=1, ..., K) in a left portion, an upper portion, and a right portion of the input image. Alternatively, as in FIGS. 9A to 9C, the background region setting unit 12 may set, as the background regions $B_k$ (k=1, ..., K), image frame regions having the plurality of widths $W_k$ (k=1, ..., K) in a left portion, an upper portion, a right portion, and a lower portion of the input image. Yet alternatively, as in FIGS. 10A to 10C, the background region setting unit 12 may set, as the background regions $B_k$ (k=1, ..., K), square regions having the plurality of widths $W_k$ (k=1, ..., K) in an upper left portion, an upper right portion, a lower left portion, and a lower right portion of the input image. In any case, in the present exemplary embodiment, it is possible to set, as the background regions $B_k$ (k=1, ..., K), regions defined by the plurality of widths $W_k$ (k=1, ..., K) in at least one place in end portions of the input image. The intervals between the plurality of widths $W_k$ (k=1, ..., K) and the value of the number K may be predetermined values determined in advance, or may be determined for each input image by performing machine learning in advance so that appropriate values are obtained by using a learning image set to which the position and the size of a region of interest in an image are assigned.

Then, similarly to the first exemplary embodiment, the overlap rate calculation unit 13 calculates overlap rates $W_{k,n}$ (k=1, ..., K) for the respective background regions $B_k$ (k=1, ..., K). Similarly, the feature amount calculation unit 14 and the foreground level calculation unit 15, respectively, calculate feature amounts $G_{k,n}$ (k=1, ..., K) and foreground levels $F_{k,x,y}$ (k=1, ..., K) for the respective background regions $B_k$ (k=1, ..., K).

The integration unit 21 hierarchically sums up the foreground levels $F_{k,x,y}$ (k=1, ..., K) calculated by the foreground level calculation unit 15, thereby calculating an integrated foreground level $IF_{x,y}$. FIG. 11 is a schematic diagram illustrating the process of calculating the integrated foreground level $IF_{x,y}$. In FIG. 11, foreground levels $F_{1,x,y}$ to $F_{3,x,y}$ are hierarchically summed up.

The detection unit 16 updates a saliency map based on the integrated foreground level $IF_{x,y}$ (x=1, ..., X, y=1, ..., Y) calculated by the integration unit 21 and detects a region of interest from the input image. The content of the process of detecting a region of interest by the detection unit 16 is similar to that in the first exemplary embodiment. The detection unit 16 extracts a candidate region for a region of interest based on the generated saliency map and sets a rectangular region circumscribing the candidate region, thereby detecting a final region of interest.

FIG. 12 illustrates a flowchart of a region-of-interest detection method according to the present exemplary embodiment. The detection flow in the present exemplary embodiment is different from that in the first exemplary embodiment in that the process of step S201 is executed between steps S105 and S106. In step S201, as described above, the integration unit 21 hierarchically sums up foreground levels $F_{k,x,y}$ (k=1, ..., K) calculated by the foreground level calculation unit 15, thereby calculating an integrated foreground level $IF_{x,y}$. Further, in step S102, the background region setting unit 12 sets a plurality of background regions $B_k$ (k=1, ..., K).

As described above, according to the present exemplary embodiment, a plurality of background regions of different sizes are set in an input image, and foreground levels are calculated for the plurality of respective background regions. Then, the calculated foreground levels for the plurality of respective background regions are integrated together, and a region of interest is detected from the input image based on the integrated foreground level and a saliency. Thus, it is possible to improve the robustness of the detection of a region of interest as compared with the case where a background region is set based on a single size as in the first exemplary embodiment.

Next, a third exemplary embodiment of the present disclosure is described. In the present exemplary embodiment, a plurality of partial regions $R_{k,n}$ (k=1, ..., K, n=1, ..., N) are set, and foreground levels $F_{k,x,y}$ (k=1, ..., K) calculated for the respective partial regions are hierarchically summed up, thereby calculating an integrated foreground level $IF_{x,y}$. The components already described in the first and second exemplary embodiments are designated by the same numerals and are not described here.

The region-of-interest detection apparatus 1 according to the present exemplary embodiment has a configuration similar to that of the region-of-interest detection apparatus 1 described in the second exemplary embodiment. Specifically, in the configuration according to the present exemplary embodiment, the region-of-interest detection apparatus 1 includes an integration unit 21 in addition to the function units described in the first exemplary embodiment. In the present exemplary embodiment, however, the content of the processing executed by the region segmentation unit 11 is different from those in the first and second exemplary embodiments.

In the present exemplary embodiment, the region segmentation unit 11 acquires an input image, and based on the similarities in color feature between pixels, segments the acquired input image into partial regions $R_{k,n}$ (n=1, ..., $N_k$) in $N_k$ ways having different granularities. In the present exemplary embodiment, a granularity corresponds to the minuteness of segmentation, i.e., how minutely an input image is segmented into partial regions.

FIGS. 13A to 13D are diagrams illustrating the states where the region segmentation unit 11 segments an original input image (FIG. 13A) into partial regions $R_{k,n}$ (n=1, ..., $N_k$) in three ways (FIGS. 13B to 13D) having a (k=1)th granularity to a (k=3)th granularity. FIG. 13B illustrates the state where the region segmentation unit 11 segments the input image into partial regions based on the (k=1)th granularity. In this case, the input image is segmented into three partial regions $R_{1,n}$ (n=1, ..., 3). Similarly, FIG. 13C illustrates the case of the (k=2)th granularity. In this case, the input image is segmented into four partial regions $R_{2,n}$ (n=1, ..., 4), i.e., $R21$, $R_{22}$, $R_{23}$, and $R_{24}$. Further, FIG. 13D illustrates the case of the (k=3)th granularity. In this case, the input image is segmented into five partial regions $R_{3,n}$ (n=1, ..., 5), i.e., $R_{31}$, $R_{32}$, $R_{33}$, $R_{34}$, and $R_{35}$. The value of the number K of each granularity may be a predetermined value determined in advance, or may be determined for each input image by performing machine learning in advance so that an appropriate value is obtained using a learning image set to which the position and the size of a region of interest in an image are assigned.

Then, the overlap rate calculation unit 13, the feature amount calculation unit 14, and the foreground level calculation unit 15, respectively, calculate overlap rates $W_{k,n}$ (k=1, ..., K), feature amounts $G_{k,n}$ (k=1, ..., K), and foreground levels $F_{k,x,y}$ (k=1, ..., K) for the partial regions into which the input image is segmented based on the granularities $N_k$. Then, similarly to the second exemplary embodiment, the integration unit 21 hierarchically sums up the foreground levels $F_{k,x,y}$ (k=1, ..., K) calculated by the foreground level calculation unit 15, thereby calculating an integrated foreground level $IF_{x,y}$. Further, similarly to the second exemplary embodiment, the detection unit 16 detects a region of interest from the input image based on a saliency and the integrated foreground level $IF_{x,y}$ (x=1, ..., X, y=1, ..., Y) calculated by the integration unit 21.

The flow of a region-of-interest detection method according to the present exemplary embodiment is similar to that according to the second exemplary embodiment. In the detection flow in the present exemplary embodiment, however, in step S101, the region segmentation unit 11 segments an input image into a plurality of partial regions $R_{k,n}$ (n=1, ..., $N_k$) in $N_k$ ways having different granularities. Further, in step S201, the integration unit 21 hierarchically sums up foreground levels $F_{k,x,y}$ (k=1, ..., K) calculated for the respective granularities $N_k$, thereby calculating an integrated foreground level $IF_{x,y}$.

As described above, according to the present exemplary embodiment, an input image is segmented into a plurality of partial regions based on a plurality of granularities, and foreground levels are calculated for the plurality of respective granularities. Then, the foreground levels calculated for the plurality of respective granularities are integrated together, and a region of interest is detected from the input image based on the integrated foreground level. Thus, it is possible to improve the robustness of the detection of a region of interest as compared with the case where an input image is segmented into partial regions based on a single granularity as in the first exemplary embodiment.

According to the above configuration, in the present disclosure, even if a region of interest overlaps a background region, or even if the feature amounts of a region of interest and a background region are similar to each other, it is possible to reduce a decrease in the detection accuracy of a region of interest.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus comprising:
   at least one memory; and
   one or more processors in communication with the memory, the one or more processors operating to:
   set a background region in an input image;
   segment the background region into a plurality of partial background regions;
   calculate respective ratios of the plurality of partial background regions to the background region;
   calculate respective feature amounts of the plurality of partial background regions;
   calculate, for each position of a plurality of positions in the input image, respective differences between a feature amount of that position and the feature amounts of the plurality of partial background regions;
   calculate, for each position of the plurality of positions, a foreground level indicating a possibility of a foreground for that position based on the respective differences between the feature amount of that position and the feature amounts of the partial background regions and the respective ratios thereof; and
   detect a region of interest based on the respective foreground levels of the plurality of positions.

2. The image processing apparatus according to claim 1, wherein the background region is set in each of a left end, an upper end, and a right end of the input image.

3. The image processing apparatus according to claim 1, wherein the respective differences are calculated in a color space.

4. The image processing apparatus according to claim 1, wherein the one or more processors further operating to calculate saliency based on a probability density ratio between the feature amount of the position and the feature amount of the portion around the position.

5. The image processing apparatus according to claim 1, wherein the background region is segmented into the plurality of partial background regions based on feature amounts of the pixels in the background region.

6. The image processing apparatus according to claim 1, wherein the foreground level for each position is a sum of products of the respective difference between the feature amount of the background region and the feature amount of each position in the input image, and the respective ratios of the plurality of partial background regions.

7. The image processing apparatus according to claim 1, wherein the one or more processors further operating to:
   integrate a plurality of foreground levels,
   set a plurality of background regions of different sizes in the input image,
   calculate foreground levels for the plurality of respective background regions,
   integrate the foreground levels for the plurality of respective background regions, and
   detect the region of interest in the input image based on saliency of the position and the integrated foreground level.

8. The image processing apparatus according to claim 1, wherein the one or more processors further operating to integrate a plurality of foreground levels,
   segment the input image into a plurality of partial regions based on a plurality of different granularities,
   calculate foreground levels for the plurality of respective granularities,
   integrate the foreground levels for the plurality of respective granularities, and
   detect the region of interest in the input image based on saliency of the position and the integrated foreground level.

9. The image processing apparatus according to claim 1, wherein the one or more processors further operating to perform machine learning in advance using a learning image set to which a position and a size of the region of interest in an image are assigned, and to determine a size of the background region for the input image.

10. The image processing apparatus according to claim 1, wherein the image processing apparatus is an imaging apparatus.

11. The image processing apparatus according to claim 1, wherein the background region is a region in an end portion of the input image.

12. The image processing apparatus according to claim 1, wherein a size of the background region has a predetermined value.

13. The image processing apparatus according to claim 1, wherein, as a relation between the feature amount of each position of the plurality of positions and a feature amount of a portion around that position, a probability density ratio of the feature amount of that position to the feature amount of the portion around that position is calculated.

14. An image processing method comprising:
   setting a background region in an input image;
   segmenting the background region into a plurality of partial background regions;
   calculating respective ratios of the plurality of partial background regions to the background region;
   calculating respective feature amounts of the plurality of partial background regions;
   calculating, for each position of a plurality of positions in the input image, respective differences between a feature amount of that position and the feature amounts of the plurality of partial background regions;
   calculating, for each position of the plurality of positions, a foreground level indicating a possibility of a foreground for that position based on the respective differences between the feature amount of that position and the feature amounts of the partial background regions and the respective ratios thereof; and
   detecting a region of interest based on respective foreground levels of the plurality of positions.

15. A non-transitory computer-readable storage medium storing a program for causing a computer to execute each process in an image processing method, the image processing method comprising:
   setting a background region in an input image;
   segmenting the background region into a plurality of partial background regions;
   calculating respective ratios of the plurality of partial background regions to the background region;
   calculating respective feature amounts of the plurality of partial background regions;
   calculating, for each position of a plurality of positions in the input image, respective differences between a feature amount of that position and the feature amounts of the plurality of partial background regions;
   calculating, for each position of the plurality of positions, a foreground level indicating a possibility of a foreground for that position based on the respective differences between the feature amount of that position and the feature amounts of the partial regions and the respective ratios thereof; and
   detecting a region of interest based on respective foreground levels of the plurality of positions.

* * * * *